(No Model.)
T. B., W., & G. W. WARD.
HARROW.
No. 274,066. Patented Mar. 13, 1883.
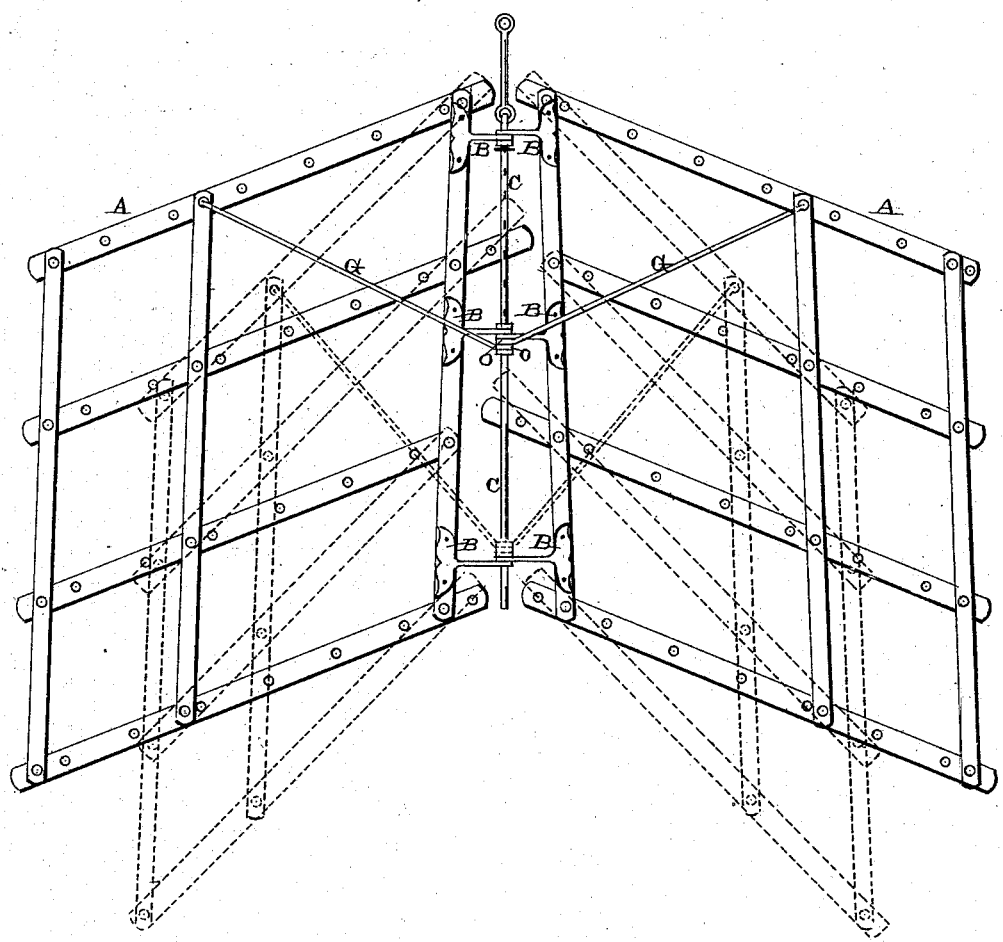

UNITED STATES PATENT OFFICE.

THOMAS B. WARD, WILLIAM WARD, AND GEORGE W. WARD, OF SOLDIERS' GROVE, WISCONSIN.

HARROW.

SPECIFICATION forming part of Letters Patent No. 274,066, dated March 13, 1883.

Application filed September 26, 1882. (No model.)

*To all whom it may concern:*

Be it known that we, THOS. B. WARD, WM. WARD, and GEO. W. WARD, of Soldiers' Grove, in the county of Crawford and State of Wisconsin, have invented certain new and useful Improvements in Harrows; and we do hereby declare the following to be a full, clear, and exact description of the invention, such as will enable others skilled in the art to which it pertains to make and use it, reference being had to the accompanying drawings, which form a part of this specification.

Our invention relates to an improvement in harrows; and it consists in the combination of two sections which are pivoted together upon a perforated rod, with a connecting-rod which extends from each section to the perforated pivotal rod, and a slide which moves back and forth upon the pivotal rod, so as to regulate the distance the two sections shall close inward toward each other, as will be more fully described hereinafter.

The object of our invention is to provide a harrow in which each section can be closed, so as to form but a very narrow harrow, or which can be opened outward, so as to form a harrow of any width that may be preferred.

Figure 1 is a plan view of our invention, showing the harrow in one form in dotted lines and in another form in solid lines. Fig. 2 is a side elevation of the pivotal rod, showing the slide placed thereon and parts of the connections in section.

A represents the two sections of the harrow, each one of which is made to open and close in the usual manner. Each one of these sections has secured to its inner edge a suitable casting, B, through which passes the perforated pivotal rod C, which serves to unite the two sections of the harrow together in the usual manner. As this perforated rod passes freely through the casting, either one of the sections can be raised up and closed back upon the top of the other, so that in drawing the harrow along only the teeth of the lower section will come in contact with the ground.

Pivoted upon the front edge of each section of the harrow is a connecting-rod, G, which extends horizontally backward, and has an eye, O, formed on its rear end, so as to pass over and slide freely back and forth upon the pivotal rod C. The rear ends of these rods can only move forward upon the pivotal rod as far as the middle casting or hinge, and as far back as the rear casting. When these ends are drawn forward as far as the central casting or hinge the harrow is extended to its utmost width, while, when the ends of the rods bear against the rear casting or hinge, the harrow is closed to its greatest extent. In order to regulate the distance which the harrow shall be opened or closed between these two extreme points, a slide, J, which moves back and forth upon the pivotal rod, is used. This slide consists of a long rod having both of its ends turned at right angles to its length and formed into eyes, so as to catch over the pivotal rod, and slides freely back and forth thereon. The front end of this slide moves back and forth between the front and middle hinges which unite the two sections together, while its rear end moves between the middle and rear hinges and serves as a stop to prevent the rear ends of the brace-rods from moving back upon the pivotal rod past a certain point. The pivotal rod is perforated at its front end, so that the pins or stops can be passed through the holes, and thus prevent the front end of the slide from passing back beyond the point at which the pin or stop is adjusted. When no pin or stop is used the rear ends of the brace-rods force the slide backward to its full extent, and the sections close backward, so as to narrow the harrow, and when the pin or stop is passed through the front hole in the rod the rear end of the slide is moved forward far enough to keep the rear ends of the brace-rods against the central hinge, and thus hold the sections of the harrow extended to their utmost width. By thus adjusting the stop or pin in the pivotal rod the width of the harrow can be regulated according to the kind of work that is to be done.

We are aware that harrows and cultivators have been made adjustable in width by means of rods which extend from the side sections to a central rod, which rod has a series of holes made through it to receive a holding-pin, and this we disclaim.

Having thus described our invention, we claim—

The combination of the two sections A, the castings or hinges B, and the pivotal rod having a series of perforations made through its front end, with the brace-rods having their rear ends formed into eyes and made to play back and forth upon the pivotal rod between two of the hinges, with the slide J, which has its ends turned at right angles and formed into eyes, substantially as described.

In testimony whereof we affix our signatures in presence of two witnesses.

THOS. B. WARD.
    WILLIAM WARD.
    GEORGE W. WARD.

Witnesses:
 CHARLES A. NEBEL,
 ISAAC D. PEPPLE.